(No Model.)  
8 Sheets—Sheet 1.

C. W. HOLM.
WIRE FENCE MACHINE.

No. 551,280.  
Patented Dec. 10, 1895.

WITNESSES:  
Lester L. Allen.  
L. Julien.

INVENTOR  
C. W. Holm.  
BY  
R. J. M'Carty  
ATTORNEY.

(No Model.)  8 Sheets—Sheet 3.
C. W. HOLM.
WIRE FENCE MACHINE.

No. 551,280. Patented Dec. 10, 1895.

WITNESSES:
Lester L. Allen.
L. Julien.

INVENTOR
C. W. Holm.
BY R. J. McCarty.
ATTORNEY.

(No Model.)

8 Sheets—Sheet 4.

C. W. HOLM.
WIRE FENCE MACHINE.

No. 551,280.  Patented Dec. 10, 1895.

WITNESSES:
Lester L. Allen.
L. Julien.

INVENTOR
C. W. Holm.
BY
R. J. McCarty
ATTORNEY.

(No Model.) 8 Sheets—Sheet 6.

C. W. HOLM.
WIRE FENCE MACHINE.

No. 551,280. Patented Dec. 10, 1895.

WITNESSES:
Lester L. Allen.

INVENTOR
C. W. Holm.
BY
R. J. McCarty
ATTORNEY.

(No Model.) 8 Sheets—Sheet 7.
C. W. HOLM.
WIRE FENCE MACHINE.
No. 551,280. Patented Dec. 10, 1895.
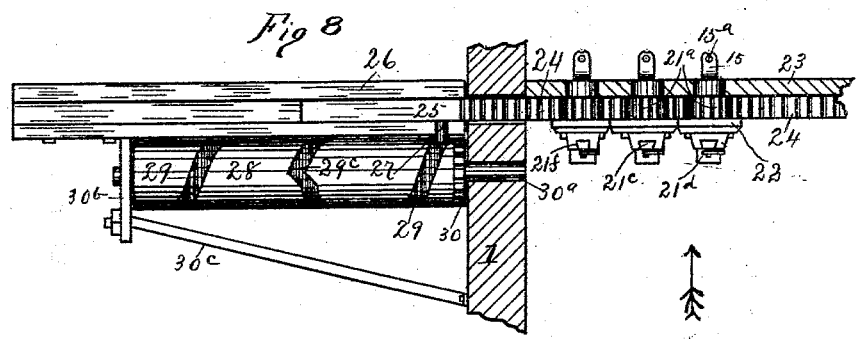
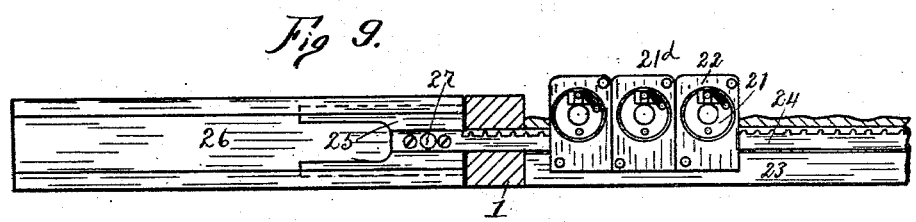
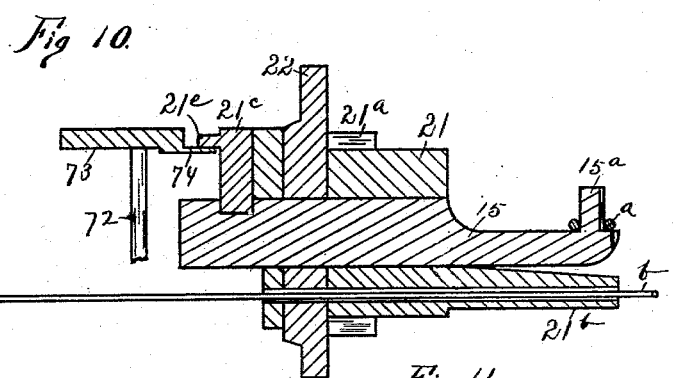
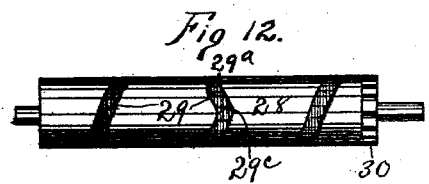
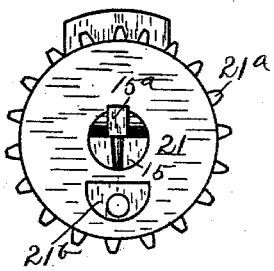
WITNESSES:
Lester L. Allen
L. Julien
INVENTOR,
C. W. Holm,
BY
A. J. McCarty
ATTORNEY.

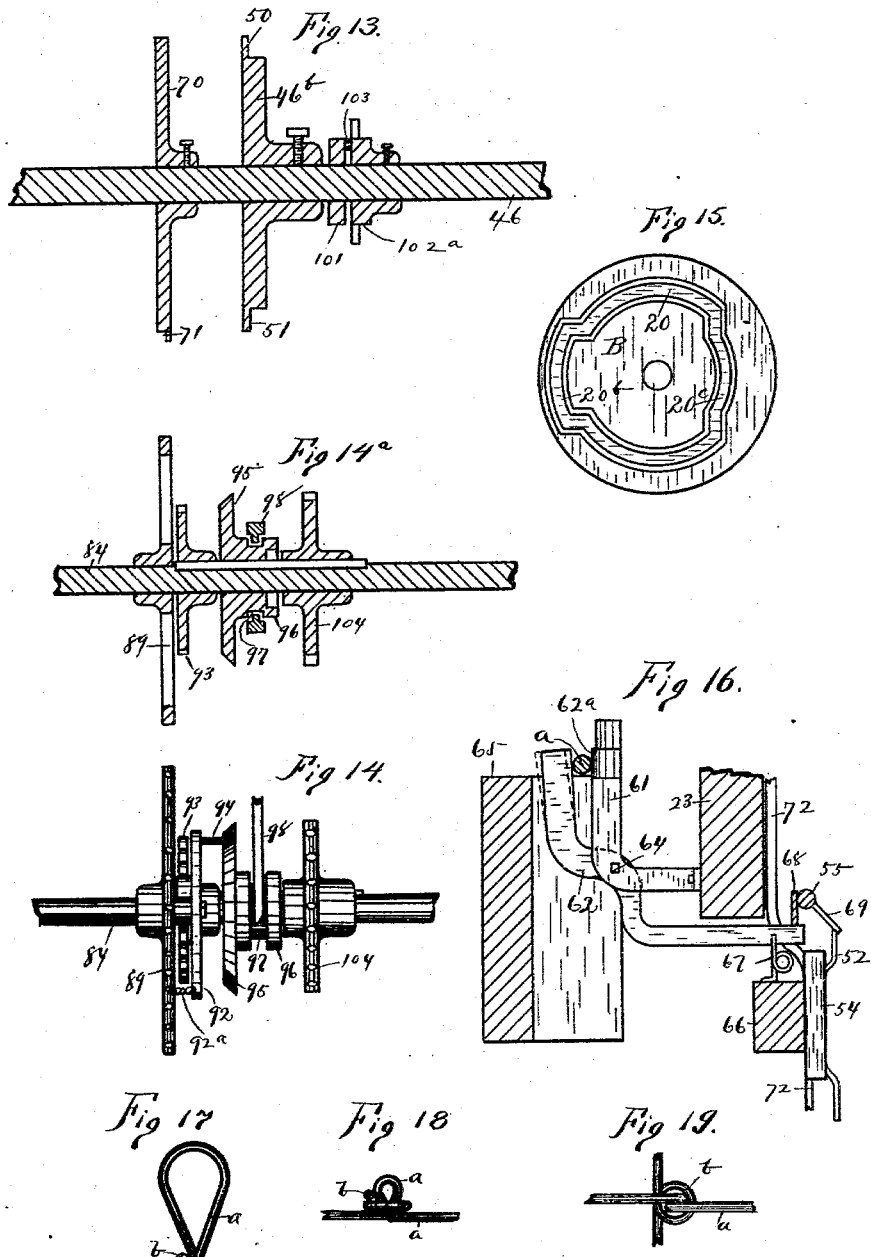

UNITED STATES PATENT OFFICE.

CHARLES WESLEY HOLM, OF TROY, OHIO.

WIRE-FENCE MACHINE.

SPECIFICATION forming part of Letters Patent No. 551,280, dated December 10, 1895.

Application filed August 23, 1895. Serial No. 560,198. (No model.)

*To all whom it may concern:*

Be it known that I, CHARLES WESLEY HOLM, of Troy, county of Miami, State of Ohio, have invented a new and useful Improvement in Wire-Fence Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in wire-fence machines.

The object of said invention is to provide a machine for factory use as distinct from that class of machines that are adapted for field work.

A further object is to provide a machine that has a capacity for turning out such quality of fencing at a greatly-increased rate, and a still further object is to provide a machine that has a capacity for uniting various sizes of horizontal wires with the vertical wires without requiring any changes in the parts of the machine.

To these ends the invention consists of parts and their arrangement, as will be fully described in the following specification, and set out in the claims.

Figure 1:
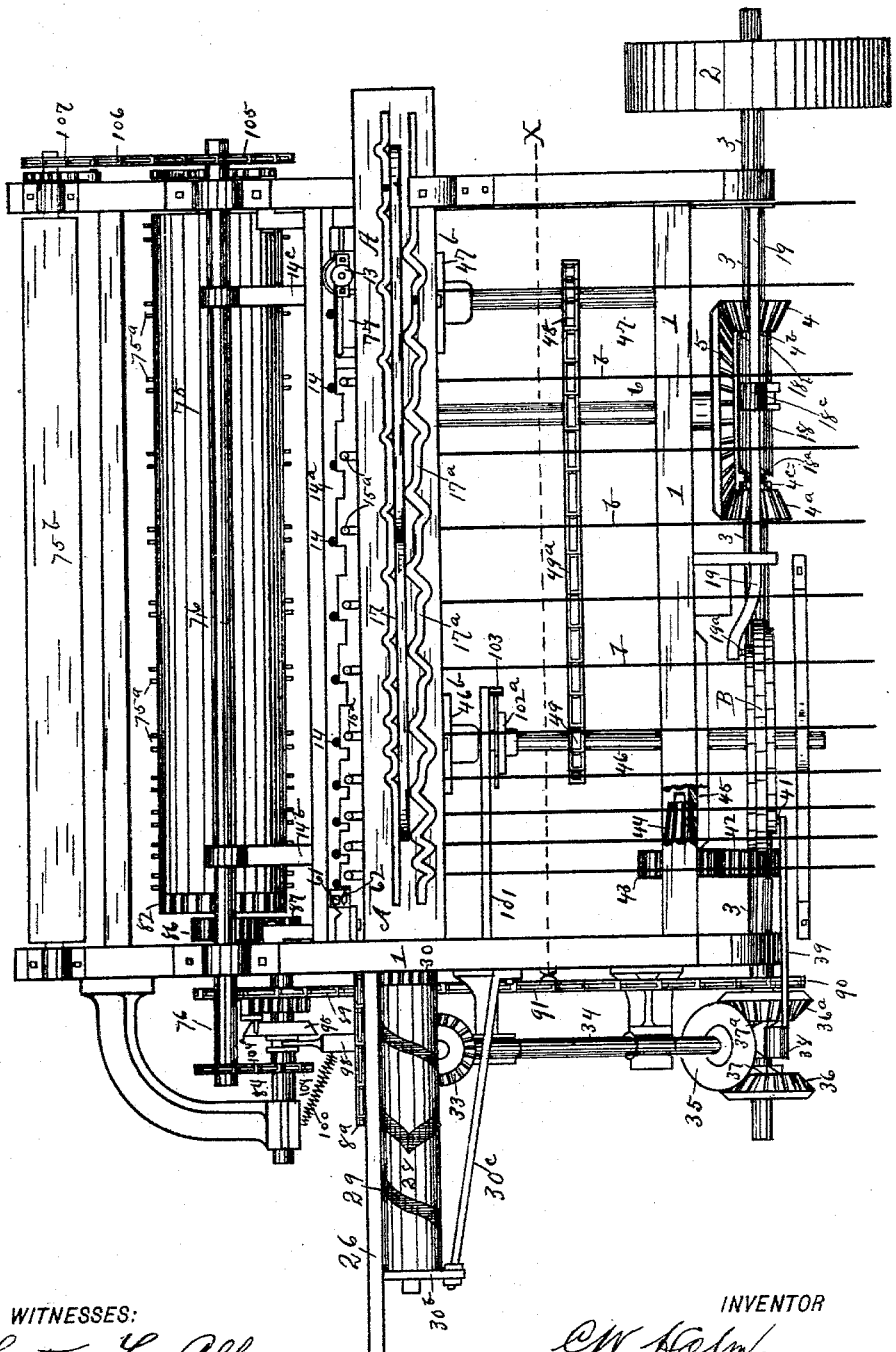
Figure 2:
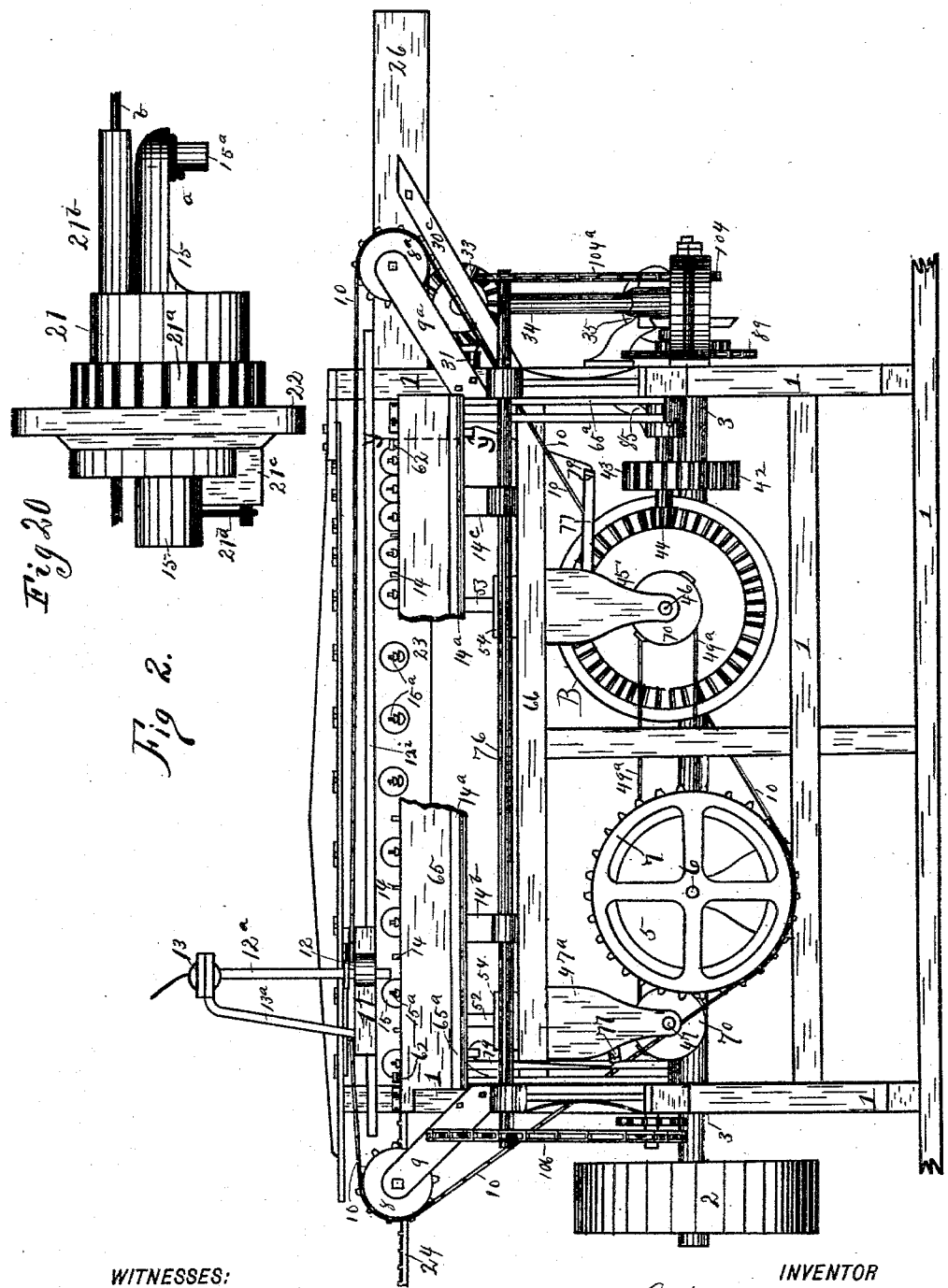
Figure 3:
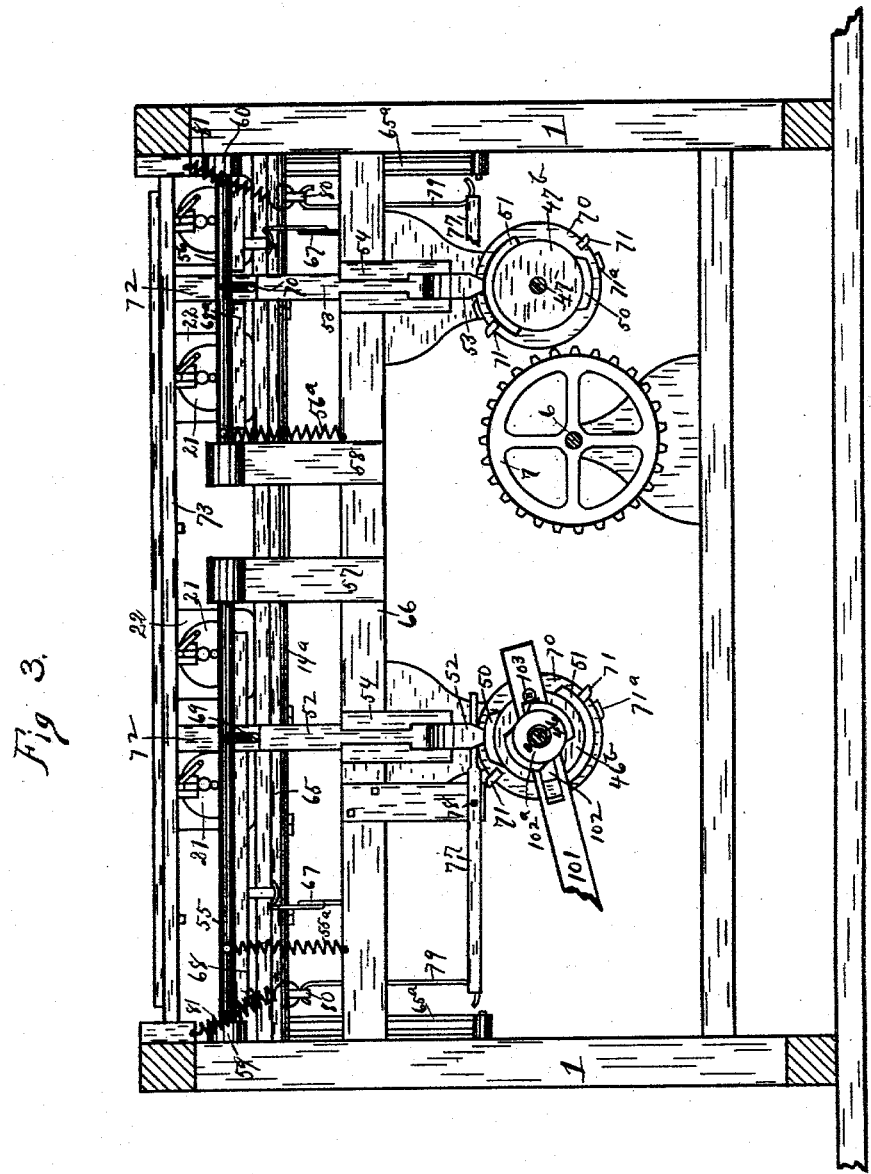
Figure 4:
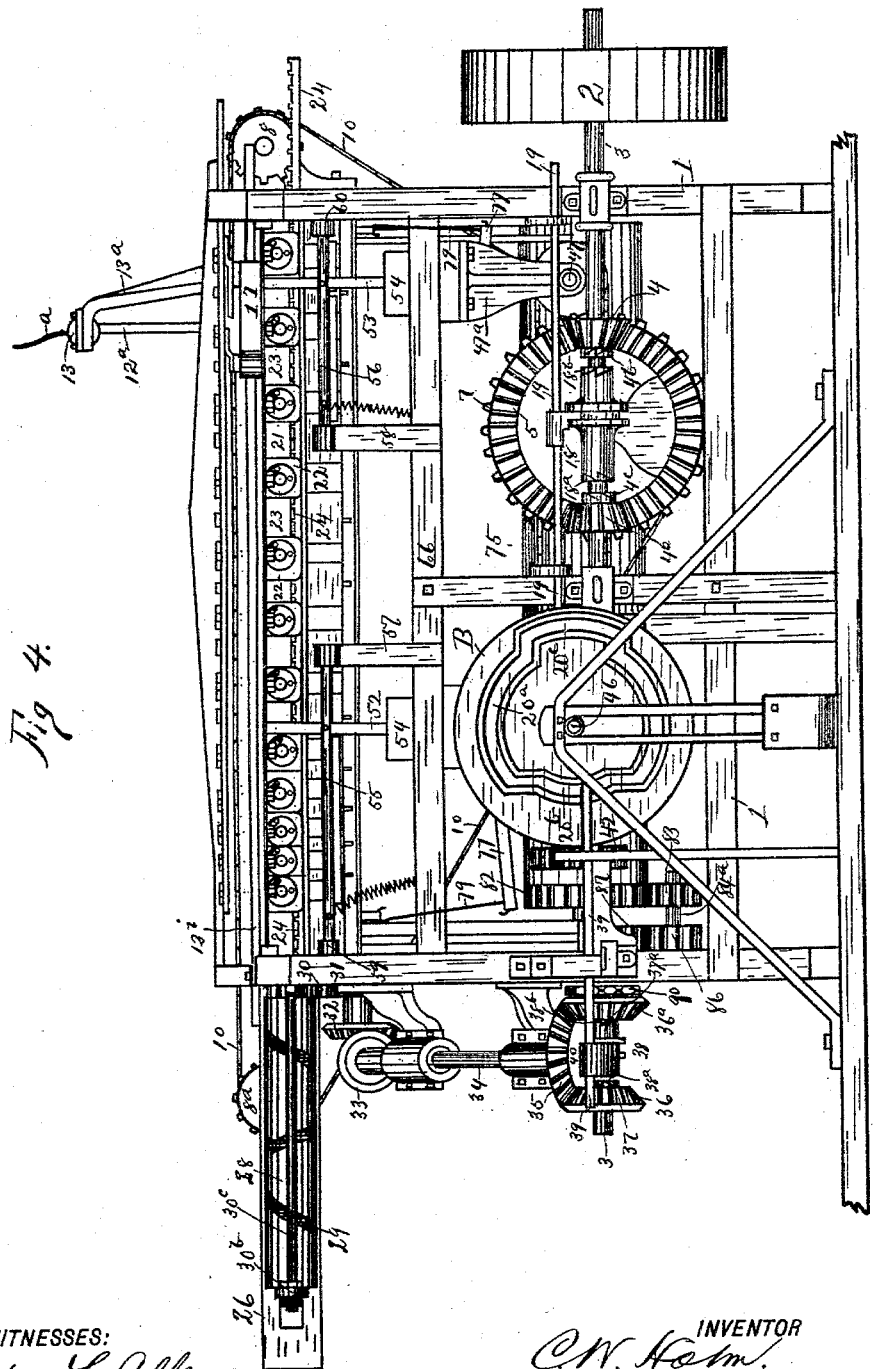
Figure 5:
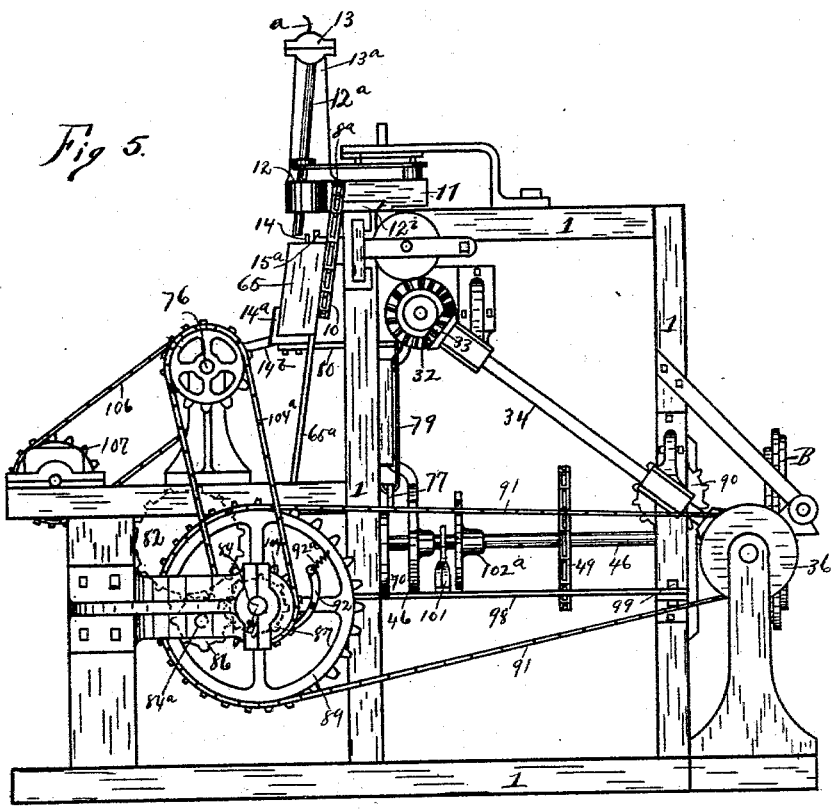
Figure 6:
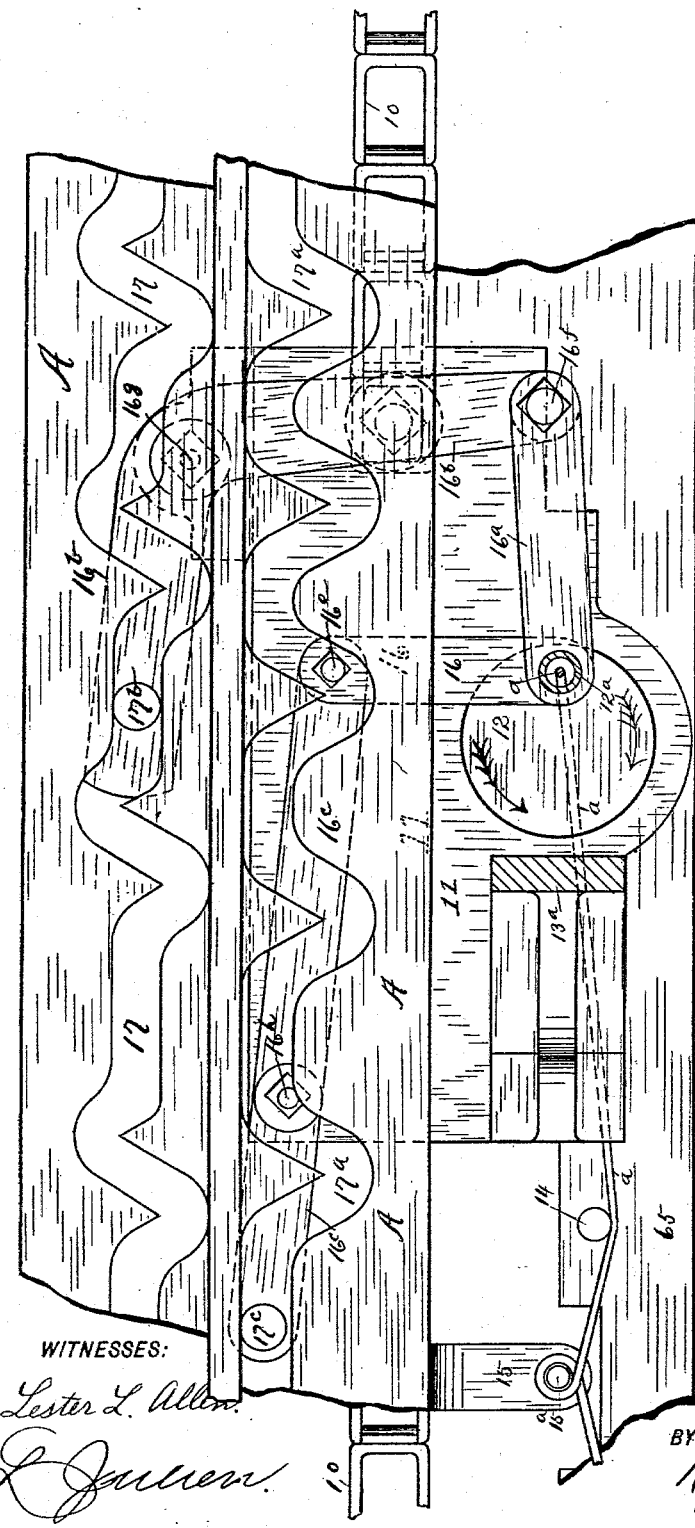

Referring to the annexed drawings, which form a part of the specification, Figure 1 is a top plan view of the machine; Fig. 2, a front elevation with the comb-cylinder and the winding-reel removed to avoid the concealment of parts; Fig. 3, a section on the line $xx$ of Fig. 1, several of the twisters being removed; Fig. 4, a rear elevation of the machine; Fig. 5, an end elevation thereof; Fig. 6, a partial top plan view of the cam-bar, the carriage, and adjunctive devices that deliver the vertical wire in a position to be operated on by the twisting devices; Fig. 7, an enlarged detail view of the gear and clutch mechanism for rotating the cam-drum; Fig. 8, an enlarged sectional view showing a portion of the rack-bar, twisters, and the cam-drum; Fig. 9, a view looking in the direction of the arrow, Fig. 8, the cam-drum removed; Fig. 10, a longitudinal section, enlarged, through one of the twisters, showing also a section of the transverse bar for raising the pins or keys from the inner shaft or member of said twisters; Fig. 11, an enlarged front view of one of the twisters; Fig. 12, a detail detached view of the cam-drum, showing the side opposite that shown in Fig. 8; Fig. 13, a section through the intermediate mechanism for operating the auxiliary row of pins and for operating the pinchers; Figs. 14 and $14^a$, detail full and sectional views of the mechanism for operating the comb-cylinder and winding reel or shaft; Fig. 15, a detached view of the primary actuating cam-disk, through which the "timing" and reversing are effected. The side shown in this view is opposite to that shown in Fig. 4. Fig. 16 is an enlarged sectional view showing one of the pinchers in side elevation. The view is taken on the line $y\,y$ of Fig. 2. Fig. 17 is a view showing the vertical wire after being placed in a position by the carriage to be acted upon by the twisters, a horizontal wire appearing in section adjacent to the cross in said vertical wire just preparatory to being placed around said crossed part of the vertical wire by the twister; Figs. 18 and 19, top and front views of a completed connection of said wires; Fig. 20, a detail detached view of a twister in side elevation.

In the various views the same reference characters indicate the same parts of the mechanism.

1 designates the parts that form the framework; 2, the driving-pulley, and 3 the main driving-shaft, which is suitably mounted in the rear part of said frame.

4 and $4^a$ designate primary bevel-gears, each of which is provided with clutch-teeth $4^b$ and $4^c$. These gears are loose on the driving-shaft 3 and are alternately thrown in and out of gear, by means hereinafter described, with a larger gear-wheel 5, which is rigidly mounted on a shaft 6, suitably journaled in brackets depending from the frame. Upon the opposite end of this shaft 6 there is rigidly mounted a sprocket-wheel 7. Running on this sprocket-wheel and on smaller sprocket-wheels 8 and $8^a$ on shafts journaled in bearings 9 and $9^a$ is a chain 10, the ends of which are attached to a slide or carriage 11, which is thereby movable horizontally in a dovetailed bearing or track $12^i$ rigidly mounted in end pieces of the frame. (See Figs. 2 and 5.) Journaled in an opening in said carriage there is a revolving disk 12 with a tubular shaft $12^a$ journaled in an eccentric position therein, (see Figs. 5 and 6,) through which the wire forming the vertical strands is threaded. The lower end of the tubular shaft $12^a$ projects through the disk substantially as shown in Fig. 2, and its upper end terminates in a round head or ball, which is loosely inclosed in a similar-shaped socket 13 on the upper end of a standard or arm $13^a$ that rises from the carriage 11, and thus there is provided at the upper end of said tubular shaft a universal joint for it to turn upon as the disk 12 is rotated to place the vertical wire $a$ alternately around the pins 14 and $15^a$, the latter pins being on the inner members or shafts 15 of the twisters, of which further mention will be hereinafter made. This rotary movement is imparted to the disk 12 through the agency of an assemblage of levers 16, $16^a$, $16^b$, and $16^c$, the two former of which are loosely connected to the lower portion of the tubular shaft $12^a$, and have also pivotal connections at $16^e$ and $16^f$ with the levers $16^b$ and $16^c$. The two latter levers have pivotal connections at $16^g$ and $16^h$ with lugs that project from the upper side of the carriage 11.

A designates a transverse bar rigidly mounted in the end pieces of the frame. In this bar there are two longitudinal cam-slots 17 and $17^a$, taking a serpentine course, substantially as shown in Figs. 1 and 6. $17^b$ and $17^c$ designate antifriction-rollers that travel in said cam-slots and have pivotal connections with the levers $16^b$ and $16^c$. (See Fig. 6.) It will be noted from this view that as the carriage, as seen in Fig. 2, is drawn back and forth over the track $12^i$ by the sprocket-chain 10 the disk 12 and tubular shaft $12^a$ will describe a series of circles due to the cam-slots directing the movements of the levers, during which the vertical wire $a$ is carried alternately around the pins 14 and $15^a$, the object of alternately placing said wire around the pins 14 being to provide a requisite amount of slack in said wire between each two of the pins $15^a$, which is taken up when the twisters operate on said wire. The pins 14 are mounted on a transverse bar or plate $14^a$, which is supported on arms $14^b$ and $14^c$ loosely mounted on a parallel shaft 76 and forming hinges for said bar $14^a$ to turn upon. Devices for moving this bar to lower the pins 14 after the wire has been laid around them will be hereinafter described.

Referring to that portion of the reversing mechanism that drives the carriage alternately back and forth, and thereby enables the placing of the vertical wire $a$ around the pins, as the carriage travels in either direction, (see Fig. 1,) 18 designates a clutch having teeth $18^a$ and $18^b$ on its respective ends. This clutch is feathered on the driving-shaft 3 between the gears 4 and $4^a$. On the middle portion of said clutch there is a circumferential channel in which a collar $18^c$ loosely fits and permits said clutch to rotate with the shaft 3.

19 designates a horizontal sliding rod mounted in suitable bearings, and to which the collar $18^c$ is attached. $19^a$ is an antifriction-roller on an end of said rod 19, and movable in a cam-groove 20 on the inner face of the disk B. (See Figs. 4 and 15.)

21 designates the twisters hereinbefore referred to that are synchronously rotated to place and twist the horizontal wires $b$ around the vertical wires independently of any movement of said vertical wires, up to a certain period, and finally to twist both horizontal and vertical wires together. These twisters each consists of a cylindrical head 21 which has peripheral gear-teeth $21^a$ and an integral eccentric shaft $21^b$ through which there is an opening for the passage of the horizontal wire. (See Figs. 10 and 20.) 15 designates a shaft or inner member of said twisters, which is journaled in the axis of the head 21, and has a pin $15^a$ projecting at a right angle, around which the vertical wires are placed, as hereinbefore stated. The inner end of the shaft 15 has a key-seat $21^f$ into which a key or pin $21^e$ is normally pressed by a spring $21^d$. Each of the twisters is independently journaled in its respective bearing-plate 22 which is rigidly attached to a transverse bar 23 having openings similar to those in the plates 22 in which said twisters also have bearing.

As shown in Fig. 4, the twisters are assembled or graduated with reference to their positions substantially as they appear, the object of which is to construct the horizontal wires nearest the ground closer together. The synchronous rotary movement of the twisters hereinbefore referred to is imparted through the agency of a horizontal rack-bar 24 movable in a guideway in the bar 23 below the twisters and meshing with the teeth $21^a$ on said twisters. (See Figs. 8 and 9.) One end of said rack-bar is attached to a slide 25 dovetailed in a guide-bar 26 mounted on an end of the frame. This slide 25 is movable in the guide 26 through the agency of an antifriction-roller 27 projecting from said slide, and a drum 28 having a cam-groove 29 into which the roller 27 projects.

30 designates a spur-gear rigid on the inner end of the shaft of the cam-drum, which shaft is journaled in the frame at $30^a$ and in a bracket $30^b$, attached to the guide-bar 26 and to the frame by a bolt-rod $30^c$. (See Fig. 8.) Reversible rotary motion is imparted to the cam-drum through a spur-gear 31 that meshes with the gear 30, a bevel-gear 32 on the shaft of the spur-gear 31, and a similar gear 33 rigid on the upper end of an inclined shaft 34 and meshing with the bevel-gear 32. The shaft 34 has rigidly mounted on its lower end a larger miter-gear 35 that is alternately driven by miter-gears 36 and $36^a$, which have clutch-teeth 37 and $37^a$, and are loosely mounted on the driving-shaft 3. There is interposed between these miter-gears a sliding clutch 38, which is feathered on the shaft 3. This clutch is movable on the shaft 3 to bring the teeth thereon, indicated by $38^a$ and $38^b$, alternately in and out of gear with the teeth 37 and $37^a$, and out of gear with both of said teeth, by a sliding rod 39, suitably mounted, and having attached to it a collar 40 which loosely surrounds the middle portion of said clutch 38, permitting it to rotate with the shaft. The rod 39 has an antifriction-roller 41 that projects into a cam-groove $20^a$ on the outer face of the disk B. The cam-grooves 20 and $20^a$ are identical in form of curvature, but they occupy positions at right angles to each other, in order that they may actuate the clutches 18 and 38 at different periods. Describing now the mechanism for rotating this cam-disk to periodically and alternately reverse the movements of the carriage 11 and the twisters, 42 designates a primary spur-gear rigid on shaft 3. (See Fig. 1.) 43 and 44 designate a spur-gear and a bevel-pinion, respectively, running with their shaft, which is journaled in suitable bearings parallel with the driving-shaft 3. Wheel 43 is actuated by intermeshing with the spur-gear 42, and in turn transmits motion to a crown-wheel 45 with which the bevel-pinion 44 meshes. The wheel 45 is rigid on shaft 46, upon which shaft is also rigidly mounted the cam-disk B. It will therefore be seen that the disk B is subjected to constant rotation with the driving-shaft, and the cam-grooves 20 and $20^a$ impart to the clutch-rods 19 and 39 alternately reciprocating movements, whereby power is accordingly transferred to shafts 6 and 34 at predetermined times to reverse the direction of the movements of the carriage and the twisting devices. While the rollers on the rods 19 and 39 are alternately riding in the respective parts $20^b$ and $20^c$ of the cam-grooves 20 and $20^a$, (see Figs. 4 and 15,) the clutches 18 and 38 are alternately brought out of gear with either of the gears 4 $4^a$ and 36 $36^a$, during which time there is an alternate dwell or cessation in the movements of the mechanisms actuated by said gears, the object of which is to permit the carriage 11 and the twisters to periodically perform their functions. Parallel with the shaft 46 there is a shaft 47 journaled in hangers $47^a$ attached to parts of the frame. This shaft has upon it a rigidly-mounted sprocket-wheel 48, over which and a similar wheel 49, rigid on shaft 46, a sprocket-chain $49^a$ runs. Said shaft 47 therefore runs continuously with and at the same rate of speed as shaft 46.

Cam devices for actuating pinchers, for raising the pins $21^c$ out of their seats in the shafts 15 of the twisters, and for drawing the pins 14 to enable the slack in the wire $a$ to be taken up by the twisters, and also to enable the connected strands to be drawn away from the twisters after each complete operation of the mechanism, are located on shafts 46 and 47. These devices consist of disks $46^b$ and $47^b$, which are rigidly mounted on said shafts. Upon the peripheries of these disks there are cam-surfaces 50 50 and 51 51, the positions of said cams on one disk being at all times the reverse of those on the other, as shown in Fig. 3. Their functions will presently be described. 52 and 53 are pitmen, movable in vertical guides 54 54, mounted on a transverse bar 66, and normally resting upon the peripheries of the disks $46^b$ and $47^b$.

55 and 56 are rock-shafts, journaled in uprights 57 and 58 and bearings 59 and 60 on the ends of the frame.

61 and 62 designate, respectively, fixed and movable members pivoted at 64 and constituting pinchers, (see Fig. 16,) of which there is a pair at each end of the machine in the path of the vertical wire $a$, which is laid therein by the tubular shaft $12^a$. These pinchers project vertically through openings in a transverse bar 65, supported on arms $65^a$ $65^a$, rigidly attached to the frame. (See Fig. 2.) This bar 65 is also provided with openings through which the pins 14 project. In Fig. 16 the pinchers are shown to have a knife-edge $62^a$ on the member 61, which is rigidly attached to the bar 23. The movable member 62 is kept normally open by a spring 67 that presses upwardly on its lower horizontal end. 68 and $68^a$ designate flanges that project longitudinally from the rock-shafts 55 and 56 and lie in a transverse position adjacent to and above the lower ends of the member 62 of said pinchers. It is understood the pinchers at both ends operate in the same manner. The wire $a$ is held by one of them at either end of the machine while the carriage is traveling away from that point and until said carriage completes its trip and places the wire in the pinchers at that end of the machine. At this time said pinchers instantly cut the wire and both pairs of pinchers open to release the connected wires and permit their removal from the pins by mechanism hereinbefore described. The pinchers are permitted to thus open by the pitmen 52 and 53 riding on the lower parts of the peripheries of the disks $46^b$ and $47^b$. The shafts 55 and 56 are rocked against the tension of springs $55^a$ and $56^a$ by said pitmen 52 and 53 pressing upwardly pins 69 and 70 that are rigidly attached to said shafts. (See Figs. 3, 4, and 16.)

As shown in Fig. 3, there is a variance in the extent of the cam-surfaces 50 and 51. This is essential in order to maintain the pitman in a raised position a sufficient length of time to enable the pinchers that are holding the wire to maintain their hold thereon until the carriage has completed its travel to the other end of the machine, when the pinchers at that end grip and cut said wire and hold the same till the pins $15^a$ are turned down, as shown in Fig. 20. The pitmen, when at the end where the operation is completed, are maintained in a raised position only long enough to thus operate said pinchers, and are at that time on the shortest cam-surface 50. There are also mounted on shafts 46 and 47, adjacent to said cam-disks 46$^b$ and 47$^b$, disks 70 70 having cam-lugs 71 71. 72 designate pitmen that normally lie in the path of said cam-lugs, and are raised by said lugs to slightly elevate a transverse bar 73 that is loosely mounted in the ends of the frame. This bar 73 occupies a position adjacent to the rear ends of the twisters, and has a plurality of projections 74 that lie at right angles below similar projections 21$^e$ on the pins 21$^c$. (See Fig. 10.) The action of the lugs 71 on both disks 70 70 is simultaneous, and said bar 73 is raised throughout its length to lift the pins 21$^c$ from their seats just prior to the twister-heads beginning to rotate. The pins 21$^c$, it will be noted in Fig. 8, fit in a dovetail slot 21$^f$ in the rear portion of the twister-head. The cam-lugs 71 are positioned to effect this removal of the pins 21$^c$ just in advance of the movement of the twister-heads by the rack-bar 24, as hereinbefore stated. The shafts 15 therefore remain stationary in the position shown in Fig. 10, with the vertical wire around the pins 15$^a$, as shown in Fig. 6, while the twister-heads make one revolution. The first half of this revolution takes up the horizontal wire $b$ from the position shown in Fig. 10, in contact with the vertical wire $a$, as shown in Fig. 17. In the next half-revolution of said twister-heads, they are laying the horizontal wires around the crossed portion of the vertical wire, making one complete revolution of said twister-heads, upon the completion of which the pins 21$^c$ instantly return to their seats in the shafts 15, under the tension of springs 21$^d$, and the next half-revolution of said twister-heads is accompanied by said shafts 15, in which both wires are twisted together, and said shafts are brought to the position shown in Fig. 20, the pins 15$^a$ projecting downwardly in a position to admit of the connected wires being removed therefrom by means presently described. Just prior to this period the pins 14 are withdrawn by levers 77 77 pivoted at 78 and actuated by the cam-lugs 71$^a$ on the disks 70. 79 are connecting-rods between said levers and bars 80, the latter rigidly attached to the transverse bar 14$^a$ upon which said pins are mounted. The bar 14$^a$ is kept in its normal or upward position by coil-springs 81. (See Fig. 3.) The synchronous and independent movements of the twisting devices, whereby I am enabled to twist the horizontal wires separately, up to a certain point, and then both horizontal and vertical wires together, are among the most salient features of the invention, as thereby each wire is subjected to an amount of twisting that it separately requires, and at the same time there is effected a firm and substantial connection of the wires.

In laying the vertical wire $a$ around the pins 15$^a$ this wire is thereby given an initial or half twist by crossing the same, and the last half-revolution of the twister-head, in which the shaft 15 joins, as before stated, completes the twisting of said vertical wire. As hereinbefore stated, when the last half-revolution of the twisters is made the pins 15$^a$ project downwardly. At this period the anti-friction-roller 27 on the slide 25, to which the rack-bar 24 is attached, is riding in the straight portion 29$^a$ of the cam-groove in the drum 28, having traveled to the point 29$^c$ in said groove and returned to the part 29$^a$ in order to provide a sufficient looseness of the connected wires around the pins 15$^a$ to enable their easy removal from said pins.

The travel of the roller 27 in the straight part 29$^a$, it will be understood, causes a stoppage of the twisters only long enough for the connected wires to be removed, after which the travel of said roller continues on to the end of the cam-groove 29 to place the twisters in a position to operate on a reverse movement. Concurrently with this dwell in the mechanism, a comb-cylinder 75 and a winding shaft or reel 75$^b$ are simultaneously rotated to comb the connected wire from the pins and wind it up. The cylinder 75 is provided with parallel rows of steel teeth 75$^a$, said rows being arranged preferably about one foot apart. These pins engage with the connected wire and comb it foot by foot from the twisting devices. Upon one end of the shaft of said comb-cylinder there is rigidly mounted a gear-wheel 82 that meshes with a secondary spur-gear 83, (see Fig. 4,) rigid on a short shaft 84$^a$ journaled in bearings in the frame and in a bracket-arm 85. Also on said shaft 84$^a$ there is a spur-gear 86 driven by a similar gear 87 rigid on a shaft 84. (See Figs. 1, 4, and 5.) 89 and 90 designate sprocket-wheels, the former being loosely mounted on the shaft 84, and the latter rigidly mounted on the driving-shaft 3, and over both of said sprocket-wheels there runs a chain 91. The wheel 89 carries a ratchet-pawl 92, which is pivoted thereto, as shown in Figs. 5 and 14, and the engaging end of said pawl is normally drawn by a spring 92$^a$ toward the teeth of a ratchet-wheel 93 rigid on shaft 84 and adjacent to the sprocket-wheel 89. On the outer face of said ratchet-pawl there is a pin 94 projecting at a right angle and normally resting on the beveled periphery of a disk 95 which is loose on the shaft 84. When the pin 94 is riding on this beveled periphery, the pawl 92 is maintained out of engagement with the ratchet-wheel 93, and the shaft 84 is stationary. The disk 95 has an integral sleeve 96, in which there is a peripheral groove 97, into which the jaws of a clutch-lever 98 project, and said disk is thereby movable upon the shaft away from the pin 94 to allow the pawl to engage with the ratchet-wheel 93 at predetermined periods to rotate the train of gears hereinbefore described, by which the comb-cylinder is rotated. The clutch-lever 98 is pivoted at 99, and is subjected to outward tension by a coil-spring 100. Movement is imparted to this lever through a bar 101, one end of which is attached to the middle portion of said lever and the other end is slotted, as at 102, and surrounds the shaft 46, adjacent to a cam 102$^a$ which is rigidly mounted on said shaft.

103 is a roller-pin that projects from the slotted end of the bar 101. When said roller-pin is on either of the lower parts of the periphery of said cam, the tension of spring 100 draws the clutch-lever 98 outwardly, and therewith the disk 95. (See Figs. 1, 5, and 14.)

104 designates a sprocket-wheel rigidly mounted on shaft 84, from which motion is transmitted to the shaft 76 through a chain 104$^a$. A sprocket-wheel 105 is frictionally mounted on shaft 76. From wheel 105 motion is transmitted to the winding-shaft 75$^b$ by a sprocket-chain 106, which also runs on a similar sprocket-wheel 107 rigid on said shaft 75$^b$. The comb-cylinder and the winding-shaft therefore rotate simultaneously. The spools or reels from which the wire is fed to the tubular shaft 12$^a$ and the twisters may be located in any convenient place.

The mechanism is "timed" and operated as follows: The wire forming the vertical wires in the fence is threaded through the tubular shaft 12$^a$, while those forming the horizontal wires are threaded through the eccentric shafts 21$^b$ of the twisters. Assuming that the carriage has just reached the position shown in Fig. 4 and is about to make a return trip across its track to lay the wire around the pins 15$^a$ and 14, the pinchers at that end of the machine catch the wire and hold it until the carriage reaches the other end of the machine by reason of the pitman 53 riding on the cam-surface 51. The roller 19$^a$ on rod 19 occupies a position in the outer concentric part 20$^c$ of the cam-groove 20 on the inner face of the time-disk B, and the roller 41 on the rod 39 occupies a position in the part 20$^c$ in the outer cam-groove 20$^a$. Hence the clutch 18 will be in gear with the bevel-gear 4, and the clutch 38 out of gear with both of the miter-gears 36 and 36$^a$. This condition of the mechanism remains *in statu quo* until the carriage reaches the limit of its movement, at which time the other pair of pinchers cut the wire and hold it. The pitmen 72 72 are elevated by the cam-lugs 71 to slightly raise the bar 73 to lift the keys or pins 21$^c$ to disconnect the twister-head 21 and the inner shaft 15. While this operation is in progress the clutches 18 and 38 are reversing their positions through the agency of the time-disk B, and power is transferred to the miter-gear 36$^a$, and therefrom to the cam-drum which actuates the rack-bar 24 to rotate the twister-heads. While said twister-heads are making their first revolution the inner shafts 15 are immovable, but at the termination of said first revolution the pins 21$^c$ return to their normal positions and interlock both parts of said twisters, after which they rotate together. When a movement of one and a half revolutions is made, one complete operation is performed and roller 27 is dwelling in part 29$^a$ of the cam-groove in the drum 28. During this dwell the wire-feeding mechanism is inactive for a period by rollers 19$^a$ and 41 being in the parts 20$^b$ and 20$^e$ of the cam-grooves in the disk B. The comb-cylinder 75 is then timed to come into action through the mechanism hereinbefore described.

Having described the invention, I claim—

1. In a wire fence machine, the combination of a plurality of twisters, consisting each of an outer member or head provided with peripheral gear teeth and an integral shaft through which the horizontal wire is threaded; an inner shaft or member journaled in the axis of said head, said inner shaft provided with a pin projecting at a right angle around which the vertical wire is placed; a rack bar intermeshing with the gear teeth on said head; means for periodically maintaining said inner shaft stationary while the outer member or head makes one revolution and for permitting them to rotate together after said one revolution, and means for actuating said rack bar and for reversing the movement thereof, substantially as described.

2. In a wire fence machine, the combination with a transverse bar provided with journal openings; a plurality of bearing plates rigidly attached to said bar over the openings therein; of a plurality of twisters each consisting of a head provided with peripheral gear teeth and an integral eccentric shaft through which the wire forming the horizontal strands is threaded; an inner shaft journaled in the axis of said head and provided with a pin around which the wire forming the vertical strands is placed; a key or pin inclosed in a slot in said head and adapted to normally project into an opening in the inner shaft; a transverse bar journaled below said pin; cam and pitman mechanism for raising said transverse bar to remove said key or pin and thereby permit the head to rotate independently of the inner shaft; and means for returning said key or pin to its normal position to permit said head and inner shaft to rotate synchronously; a rack bar meshing with the gear teeth on said head, and cam and clutch mechanism for actuating said rack bar and for reversing the movement thereof, substantially as herein described.

3. In a wire fence machine, the combination of a plurality of twisters consisting each of a head provided with a guide slot; peripheral gear teeth and an eccentric integral shaft with a longitudinal opening therein; an inner member or shaft journaled in the axis of said head and provided with a pin and an opening; a spring-pressed pin adapted to normally interlock said head and inner shaft; a rack bar intermeshing with the teeth on said head, and cam devices for actuating said rack bar, substantially as herein described.

4. In a wire fence machine, the combination of a plurality of twister heads provided each with peripheral gear teeth and an integral eccentrically projecting shaft having an opening for the horizontal wire; an inner shaft journaled in the axis of said twister head and provided with a pin around which the vertical wire is placed; a spring-pressed pin normally interlocking said inner shaft and twister head; cam and pitman mechanism for moving said pins to periodically maintain said inner shaft stationary during a revolution of said twister head and for permitting a synchronous rotation of said parts; a rack bar intermeshing with said heads; a slide to which said rack bar is attached; a roller mounted on said slide; a drum provided with a cam groove in which said roller travels and dwells in an intermediate part thereof; and means for rotating said drum and for reversing the movement thereof, substantially as described.

5. In a wire fence machine, the combination of a plurality of twisters composed each of two members, one adapted to remain stationary while the other member completes the first revolution and both of said members adapted to rotate synchronously at the end of said first revolution; and means for interlocking and releasing said members as described; gear teeth on the periphery of one of said members; a rack bar intermeshing with said gear teeth; a drum provided with a cam groove the middle portion of which is straight; a slide to which said rack bar is attached, and a guideway for said slide; a roller mounted on said slide and movable in said cam groove, and means for rotating said drum and for reversing the movement thereof, substantially as described.

6. In a wire fence machine, the combination with a transverse bar; bearing plates rigidly attached to said bar; of a plurality of twister heads each of which is provided with peripheral gear teeth and an integral eccentrically projecting shaft through which the horizontal wires are threaded; an inner shaft journaled in each of said twister heads provided with a pin around which the vertical wire is placed; a spring-pressed key or pin adapted to normally lock said inner shaft with its respective twister head; a movable transverse bar mounted below said key or pin; cam and pitman mechanism to periodically raise said transverse bar and thereby raise said key or pin from its normal position to permit said inner shaft to remain stationary while its respective twister head revolves; a rack bar engaging with the twister heads to rotate them, and cam devices for actuating said rack bar, substantially as described.

7. In a wire fence machine, the combination of a plurality of twisters each consisting of an outer and inner member, the latter adapted to support the vertical wire in a stationary position until the outer member makes one revolution to lay the horizontal wire around said vertical wire; means for interlocking both members after said one revolution has been made by the outer member; a drum provided with a cam groove, and means operated by said cam groove for rotating said twisters, substantially as described.

8. In a wire fence machine, the combination with a transverse bar and a plurality of bearing plates; of a plurality of twisters journaled in said bar and plates each consisting of an outer and inner member, said outer member having gear teeth, and an integral shaft through which the horizontal wire is threaded, said inner member having a pin around which the vertical wire is laid; a pin normally interlocking both members, and means for moving said pin prior to the initial movement of said twisters, whereby said inner member is enabled to remain stationary while the outer member rotates; a spring to press said pin into its normal position after said outer member has made one revolution, and thereby permit both members to rotate synchronously; a rack bar gearing with said outer member; cam devices for actuating said rack bar; pinchers to cut and hold the vertical wire; and means for placing said vertical wire around the pins on the inner member of said twisters, substantially as herein described.

9. In a wire fence machine, the combination of a transverse bar provided with longitudinal cam slots; a carriage movable horizontally below said transverse bar; a revoluble disk journaled in said carriage; a tubular shaft eccentrically journaled in said disk; a plurality of levers pivoted to said carriage and tubular shaft; rollers mounted on said levers and adapted to run in said longitudinal slots, and means for actuating said carriage and for reversing the movement thereof, substantially as herein described.

10. In a wire fence machine, the combination of a transverse bar provided with longitudinal cam slots; a carriage mounted below said cam slots; a revoluble disk journaled in said carriage; a tubular shaft through which the vertical wire is threaded, journaled in said disk, and provided with a universal joint at its upper end; an assemblage of levers pivoted to said carriage and tubular shaft; antifriction rollers on said levers and movable in said cam slots; a plurality of twisters, each composed of an inner and outer member, said inner member having a pin around which the tubular shaft places the vertical wire, and means for moving the carriage in a horizontal plane and for reversing the movement thereof, substantially as described.

11. In a wire fence machine, the combination of a transverse bar provided with longitudinal cam slots; a plurality of twisters, each consisting of two members, to wit, an outer and an inner member, both of which are movable together or independently, said inner member provided with a pin standing at a right angle; a carriage traversable on a horizontal plane above said twisters, and below the cam slots; a disk journaled in said carriage; a tubular shaft eccentrically journaled in said disk; a plurality of levers interposed between said carriage, shaft, and the cam slots; anti-friction rollers on said levers, and means for actuating said carriage and twisters, substantially as described.

12. In a wire fence machine, the combination of a transverse bar provided with longitudinal cam slots; a carriage; a revoluble disk journaled in said carriage; a tubular shaft journaled in said disk and provided with a universal joint; levers connected to said tubular shaft; bell crank levers pivoted to said levers and to the carriage; rollers mounted on said bell crank levers and movable in the cam slots in said transverse bar; a plurality of twisters each consisting of two members one of which is provided with a pin; an outer parallel row of pins alternating in position the pins in said twisters; pinchers to cut and hold the vertical wire, and means for actuating said mechanism, substantially as herein described.

13. In a wire fence machine, the combination of a transverse bar provided with longitudinal cam slots; a carriage; a revoluble disk journaled in said carriage; a tubular shaft eccentrically journaled in said disk; levers interposed between said tubular shaft and said longitudinal cam slots; a plurality of twisters, each of which consists of detachable members having gear teeth and a pin; a parallel row of pins adjacent to the pins in the twisters, and around both of which pins the vertical wire is carried by said tubular shaft; a rack bar, and cam and clutch mechanism for actuating said devices, substantially as herein described.

14. In a wire fence machine, the combination of a transverse bar provided with longitudinal cam slots; a carriage movable below said bar; a revoluble disk journaled in said carriage; a tubular shaft through which the vertical wire is threaded, eccentrically journaled in said disk; levers interposed between said shaft and cam slots; cam and clutch mechanism for actuating said carriage whereby the levers, controlled by said cam slots, will cause a rotation of said tubular shaft, substantially as described.

15. In a wire fence machine, the combination of a transverse bar provided with cam slots; a carriage; a revoluble disk journaled in said carriage; a tubular shaft having a universal joint journaled in said disk; an assemblage of levers interposed between said tubular shaft and the cam slots in the transverse bar; twisters mounted below said carriage and provided with gear teeth and pins; a parallel row of pins adjacent to the pins on said twisters, around both of which the tubular shaft lays the vertical wire; pinchers for holding and cutting said wire; and cam and lever mechanism for actuating said devices, substantially as described.

16. In a wire fence machine, the combination with the disk B provided with cam grooves; clutch and lever mechanism actuated thereby; of a carriage provided with a revoluble disk; a tubular shaft eccentrically journaled in said disk; a transverse bar provided with longitudinal cam slots, mounted above said carriage; levers interposed between said carriage and cam slots, and controlled by the latter, and means for actuating said carriage and disk B, substantially as described.

17. In a wire fence machine, the combination with the disk B, and clutch and lever mechanism actuated thereby, as described; of a carriage provided with a disk 12; a tubular shaft 12$^a$ journaled in said disk; a transverse bar provided with cam slots 17 and 17$^a$; levers having anti-friction rollers interposed between said carriage, tubular shaft, and cam slots; a plurality of twisters each of which is provided with peripheral gear teeth, and a pin projecting at a right angle, around the latter of which the tubular shaft lays the vertical wire; a comb cylinder to remove the connected wires, and means for actuating said comb cylinder after the completion of an operation of the twisting mechanism, substantially as described.

In testimony whereof I have hereunto set my hand this 9th day of April, 1895.

CHARLES WESLEY HOLM.

Witnesses:
R. J. McCARTY,
DORSEY KREITZER.